US012602634B1

(12) United States Patent
Dirks et al.

(10) Patent No.: US 12,602,634 B1
(45) Date of Patent: Apr. 14, 2026

(54) SYSTEMS AND METHODS FOR STAFFING MASTER CONTROLLER

(71) Applicant: TrueBlue, Inc, Tacoma, WA (US)

(72) Inventors: Jeffrey S. Dirks, Kirkland, WA (US);
Jatin Malhotra, Quebec (CA);
Meishelle Lynn HaverKamp, Gulfport,
FL (US); Carlos A. Lara Maldonado,
Bellevue, WA (US); Mathew Wolfe,
Littletonw, NH (US)

(73) Assignee: TRUEBLUE, INC., Tacoma, WA (US)

( * ) Notice: Subject to any disclaimer, the term of this
patent is extended or adjusted under 35
U.S.C. 154(b) by 18 days.

(21) Appl. No.: 18/542,793

(22) Filed: Dec. 18, 2023

(51) Int. Cl.
*G06Q 10/0631* (2023.01)
*G06N 20/00* (2019.01)

(52) U.S. Cl.
CPC .............. *G06Q 10/063112* (2013.01); *G06Q*
*10/063116* (2013.01); *G06N 20/00* (2019.01)

(58) Field of Classification Search
CPC .............. G06Q 10/063112; G06Q 10/063116
USPC ...................................................... 705/7.14
See application file for complete search history.

(56) References Cited

U.S. PATENT DOCUMENTS

| | | | |
|---|---|---|---|
| 2018/0121766 A1* | 5/2018 | McCord | G06N 20/00 |
| 2020/0272978 A1* | 8/2020 | Flores | G06Q 10/063116 |
| 2021/0142259 A1* | 5/2021 | Kalia | G06Q 10/06316 |
| 2024/0104467 A1* | 3/2024 | Guha | G06Q 10/06398 |
| 2024/0161032 A1* | 5/2024 | Moyal | G06Q 10/063114 |
| 2024/0394414 A1* | 11/2024 | Radha | G06F 9/5044 |

OTHER PUBLICATIONS

Harman H and Sklar El (2022), Multiagent task allocation for
harvest management. Front. Robot. AI 9:864745. (Year: 2022).*

* cited by examiner

*Primary Examiner* — Dione N. Simpson
(74) *Attorney, Agent, or Firm* — Evolve Patent Law
Group PLLC

(57) ABSTRACT
Apparatuses, systems, and methods described herein include
receiving by a quantum hybrid branch simulation engine, a
request for a next task by a branch personnel or worker. The
branch simulation engine may receive data representing a
simulated branch environment and apply a deep reinforce-
ment learning (DRL) staffing operations model to predict a
next action or task. The model may weigh impacts of a
reward to substantially maximize the reward in light of a
policy to determine the next action and update a database to
store/represent a next state of the simulated or real-life
branch environment after the next action is performed.

17 Claims, 9 Drawing Sheets

300

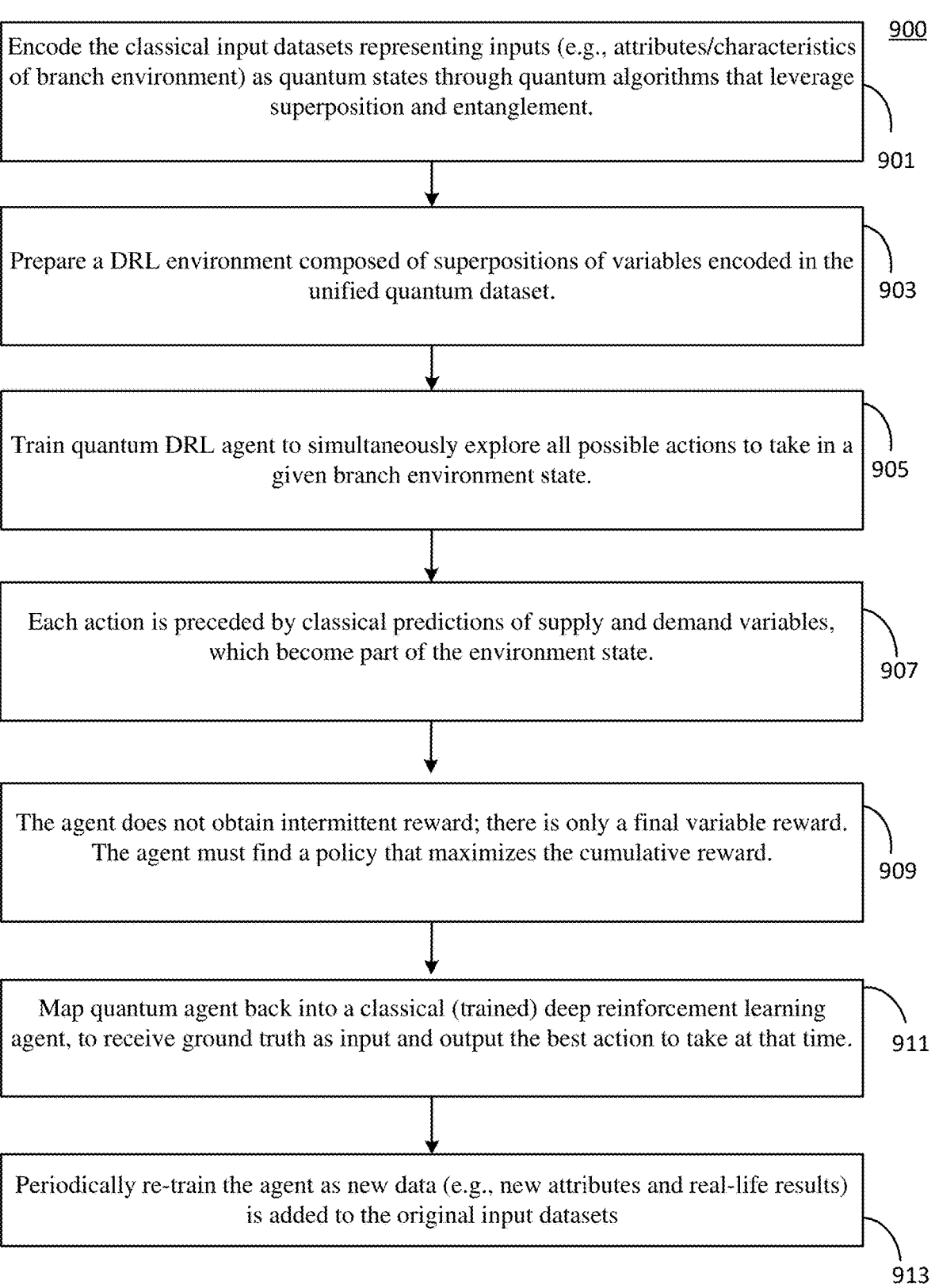

Encode the classical input datasets representing inputs (e.g., attributes/characteristics of branch environment) as quantum states through quantum algorithms that leverage superposition and entanglement.

901

Prepare a DRL environment composed of superpositions of variables encoded in the unified quantum dataset.

903

Train quantum DRL agent to simultaneously explore all possible actions to take in a given branch environment state.

905

Each action is preceded by classical predictions of supply and demand variables, which become part of the environment state.

907

The agent does not obtain intermittent reward; there is only a final variable reward. The agent must find a policy that maximizes the cumulative reward.

909

Map quantum agent back into a classical (trained) deep reinforcement learning agent, to receive ground truth as input and output the best action to take at that time.

911

Periodically re-train the agent as new data (e.g., new attributes and real-life results) is added to the original input datasets

SYSTEMS AND METHODS FOR STAFFING MASTER CONTROLLER

TECHNICAL FIELD

This disclosure relates generally to machine learning and in particular as applied to deep reinforcement learning (DRL) in the staffing industry.

BACKGROUND INFORMATION

Deep reinforcement learning (DRL) is a type of machine learning that combines reinforcement learning (RL) and deep learning. RL is a machine learning paradigm where an agent learns how to behave in an environment by trial and error. The agent is rewarded for taking actions that lead to desired outcomes and penalized for taking actions that lead to undesired outcomes. Over time, the agent learns to take actions that maximize its expected reward.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 9 is an example process, in accordance with embodiments of the disclosure.

DETAILED DESCRIPTION

Figure 1:
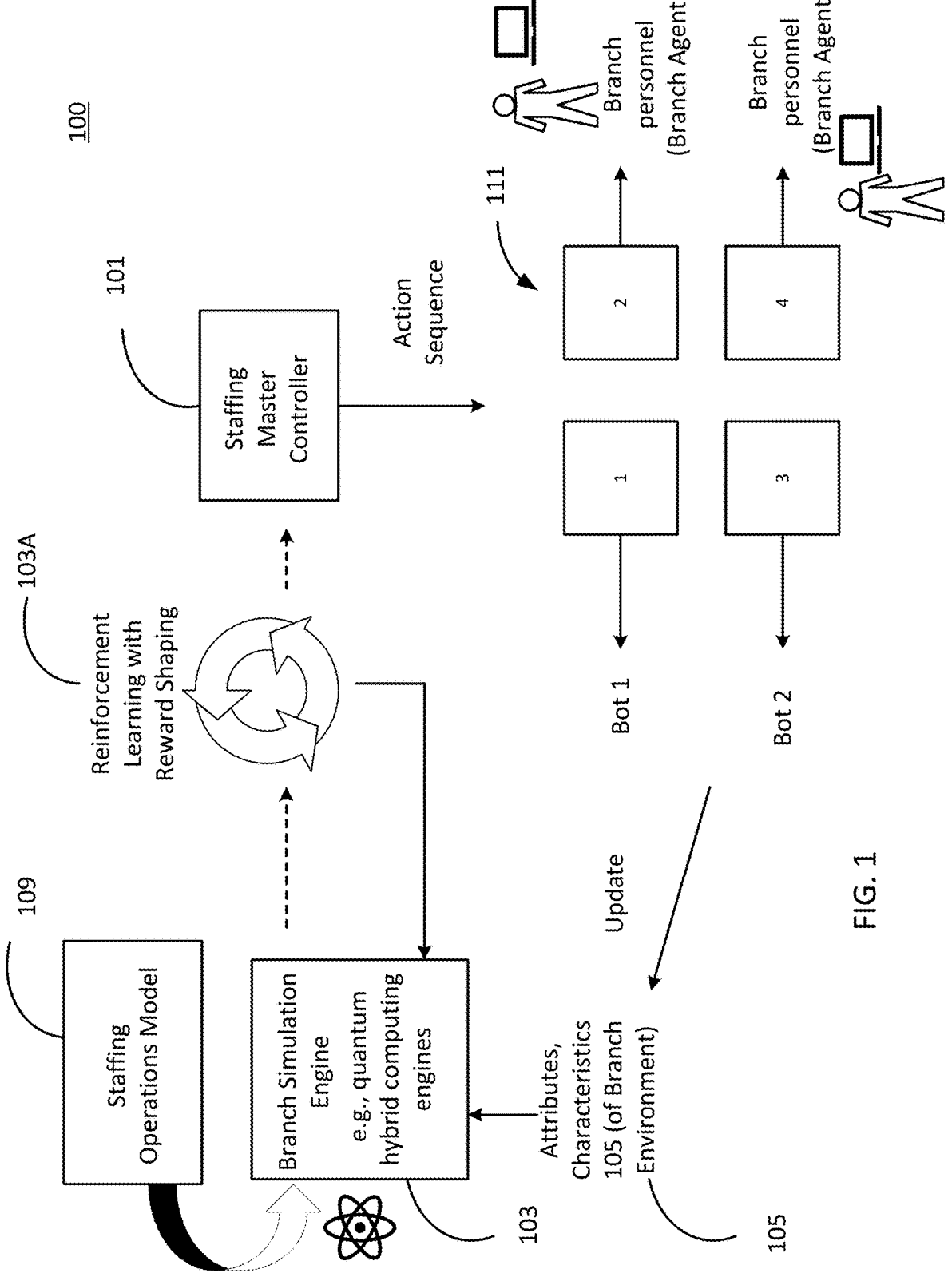
FIG. 1 illustrates an example environment including a system to implement a staffing master controller, in accordance with embodiments of the disclosure.

Currently, employees or personnel at staffing branches including operational managers need to evaluate data from multiple sources to make decisions on how to prioritize tasks. In the context of the organization's goals and current environment, personnel may not know how best to use their time, e.g., when to reach out to customers, when to make a site visit, how/when to access data, or whether to focus on office tasks.

For example, a branch may need to fill orders needed by multiple customers. Typically, the branch manager may first analyze a customer list to prioritize which customer to attend to first. The branch manager may end up selecting a client who may be a high priority client or a client that needs associates or workers right away. Next, the branch manager may review a list of workers (also referred to as "associates") to determine which of them have the right skills and certifications to work for a particular customer. Accordingly, they may then check to see which of these associates are already on other shifts or otherwise unavailable. Finally, the branch manager may look up pay records to determine if this associate has worked for this customer before and if it was a successfully completed shift. If so, s/he at that point, finally fills the order and offers the associate the shift. In the meantime, it is not clear that spending this time matching this particular associate to this shift was the correct task or most efficient task that the branch manager should have performed. For example, the branch manager may or may not have brought more value to the organization by making an overdue site visit for a potential large staffing project in the future during the same time period or matching a dozen workers to a dozen mid-size or mid-value clients during the same time period.

Due to the large number of variables involved, fluctuating uncertainties, and lack of holistic data, attempting by an employee or personnel (also "branch personnel") to manually determine a next task or action can be difficult. Using data to recommend a next task to branch personnel is a complex task when trying to accurately model the complex, nonlinear dynamics of an environment, e.g., branch environment, that changes from moment to moment. Accordingly, embodiments described below use a core machine learning algorithm driven by deep reinforcement learning (DRL) to predict a substantially optimal action to take, given a finite set of variables or parameters, collectively referred to as a branch environment state. In various embodiments, a DRL agent is trained with virtual simulated environments that represent branch dynamics.

Moreover, systems and methods described herein combine hybrid classical and quantum computing ("hybrid quantum computing") and DRL to aid in improved or optimal decision-making. A quantum computer can perform $2^N$ operations simultaneously. Quantum neural networks (QNNs) and quantum reinforcement circuits can provide insight into the probability of various outcomes given changing variables in a branch environment. Central to embodiments include a quantum reinforcement learning agent that continuously learns short-term and long-term impacts of actions performed in a branch environment and adjusts its policy to substantially optimize sequential decision-making. In embodiments, a staffing operations model is prepared based upon existing policy and processes of an organization and/or a branch office. In embodiments, a branch simulation engine, e.g., a quantum hybrid branch simulation engine, applies the staffing operations model as a DRL model to a simulated branch environment.

These and other embodiments are described in detail below with respect to FIGS. 1-9.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A) B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

FIG. 1 illustrates an example environment 100 including a system or network to implement a staffing master controller 101 and a branch simulation engine 103. In aspects, staffing master controller 101 may be coupled to generate a recommended action sequence 111 based on input and training by a branch simulation engine 103. In embodiments, branch simulation engine 103 applies branch environment attributes and characteristics 105 to a staffing operations model 109 to determine recommended action sequence 111. In embodiments branch simulation engine 103 utilizes rein- forcement learning with reward shaping 103A to substan- tially maximize a reward in light of a policy of a branch or organization. Using information and policies generated by the branch simulation engine 103, a master DRL agent can recommend real-time action or a sequence of actions for real-life branch worker or personnel. As shown at action or task sequence 111, an action can include a plurality of actions that are prioritized and delegated among one or more branch workers/personnel and bots. In embodiments, actions taken by real-life branch personnel and/or bots contribute to changing variables in the branch environment and accord- ingly, the attributes and characteristics of the branch envi- ronment are iteratively updated and compared to predicted results to refine staffing operations model 109.

Examples of tasks or actions that reflect responsibilities and decisions made by branch personnel include, but are not limited to: assigning workers (also referred to as associates) to open jobs, adjusting pricing strategies, managing worker compensation costs, initiating customer outreach or support, handling customer complaints by allocating additional workers, offering discounts, or taking other corrective actions, managing/monitoring workers inventory to improve fill-rate, implementing customer attention campaigns, cre- ating worker shift schedules, and/or handling last minute changes when a worker calls in sick or a customer cancels an order. Note that "customer(s)" as used herein may refer to an entity that has an arrangement with a staffing organi- zation to provide them with workers (also "associates").

In some embodiments, visual aspects of a staffing branch are simulated for display to branch personnel. For example, a computing device may display job orders, worker assign- ments, customer interactions, and resulting task assignments to branch personnel and/or the staffing organization using high-performance real-time 3D-graphics applications utiliz- ing parallel computing, e.g., Vulkan Graphics™ for enhanced realism.

Figure 2:
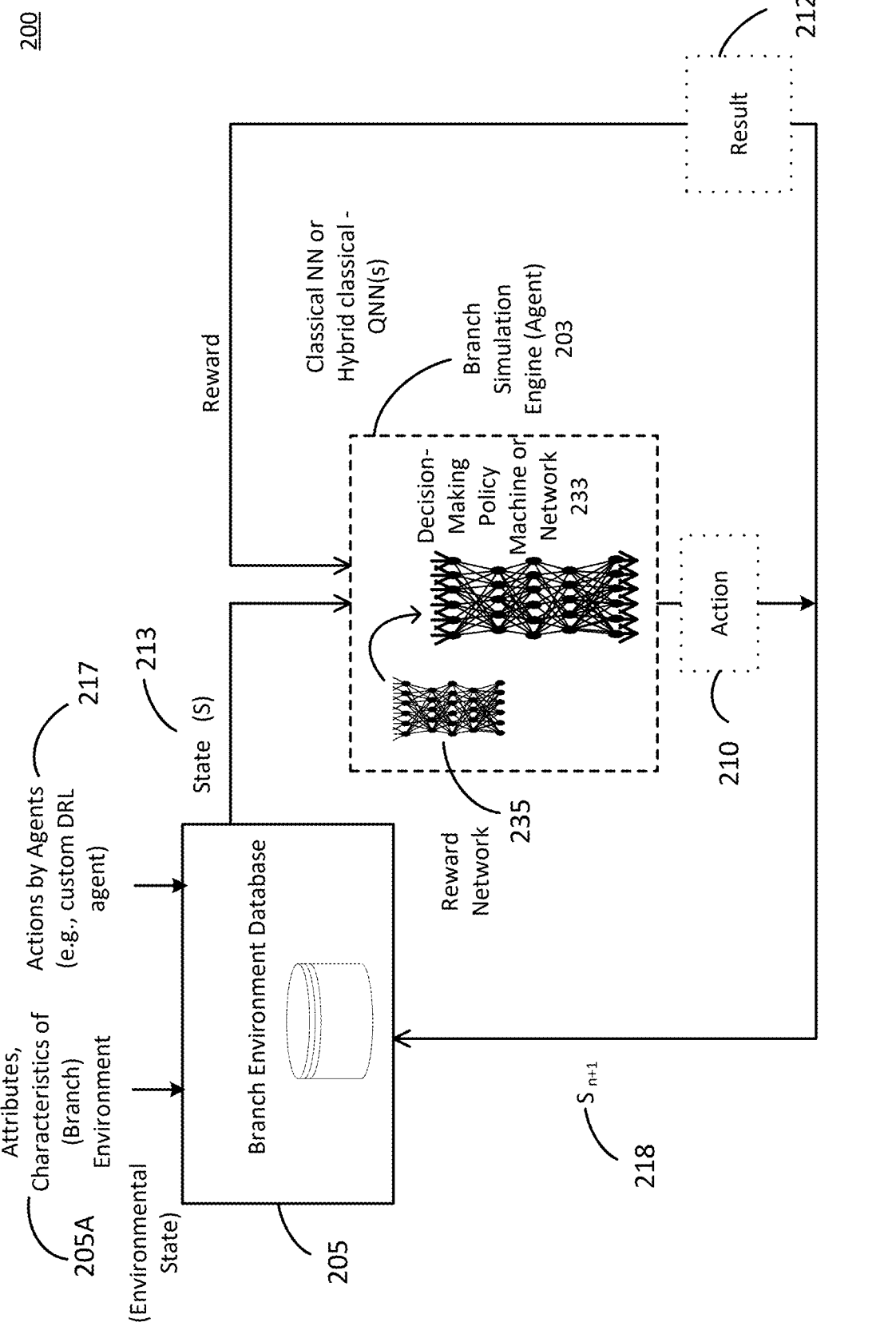
FIG. 2 is a block diagram of a deep reinforcement learning (DRL) system including a branch simulation engine of FIG. 1, in more detail, in accordance with embodiments of the disclosure.

FIG. 2, illustrates example branch simulation engine 203 coupled to branch environment database 205, in embodi- ments. In aspects, branch environment database 205 receives and stores a dataset of attributes and characteristics 205A that represents a branch simulation environment. In some embodiments, dataset of attributes and characteristics 205A also includes actions and/or information about actions/tasks of custom DRL agents 217 (further shown and discussed in relation to FIG. 4). In aspects, branch environment database 205 provides a State 213 to branch simulation engine 203 and receives a next state, $State_{n+1}$ 218 from an output of branch simulation engine 203.

In embodiments, branch simulation engine 203 includes, at least, a decision-making policy machine 233 and a reward network 235. In the example, branch simulation engine 203 uses information from branch environment database 205 about State 213 to determine a next action or task for a simulated branch personnel to take. In aspects, branch simulation engine 203 applies a DRL staffing operations model to the dataset to determine the next action according to impacts and predicted reward of the next action on a staffing organization or branch.

In aspects, a result 212 impacts a reward calculation (e.g., according to a reward function discussed further below) in a new environment state $S_{n+1}$ that is returned to branch simulation engine 203 to update decision making policy machine 233 and reward network 235. In embodiments, a policy implemented by decision-making policy machine 233 includes variables that represent relative objectives and values of a staffing organization and/or branch such as for example, maximizing profit, worker safety, customer satis- faction, and environmental impact.

In some embodiments, branch simulation engine 203 is trained from scratch (without any prior data on past actions, outcomes, or branch dynamics) through the creation of only virtual simulated environments representing branch dynam- ics. This involves building a model of the environment based only on domain knowledge.

In embodiments, branch simulation engine 203 (as well as master DRL agent 520 of FIG. 5) is a quantum hybrid simulation engine that involves combining quantum com- puting capabilities with classical computing to improve efficiency of running the DRL staffing operations model. For example, classical computing may handle an overall work- flow and coordination receiving datasets from different sources (e.g., see below regarding custom DRL agents) and organizing and displaying action sequences to proper parties (real-life branch personnel and/or bots), as discussed in connection with FIG. 1.

In aspects, branch simulation engine 203 may include one or more classical DNNs or hybrid-classical quantum neural networks (QNNs) that includes an artificial neural network (ANN). For example, branch simulation engine 203 (as well as master staffing engine 520 of FIG. 5) may include one or more QNNs that includes layers that are integrated with classical neural networks. In various embodiments, one or more of the reward networks or decision-making policy machines of FIGS. 2-5 including a policy network may include a feed-forward QNN that includes QNN layers including qubits. Note that reward network 235 and deci- sion-making policy network 233 are simplifications that are merely illustrative. In most embodiments, reward network 577 will be a separate NN from decision-making policy machine 233, however in some implementations reward network and decision-making policy machine 233 may be the same NN.

Figure 3:
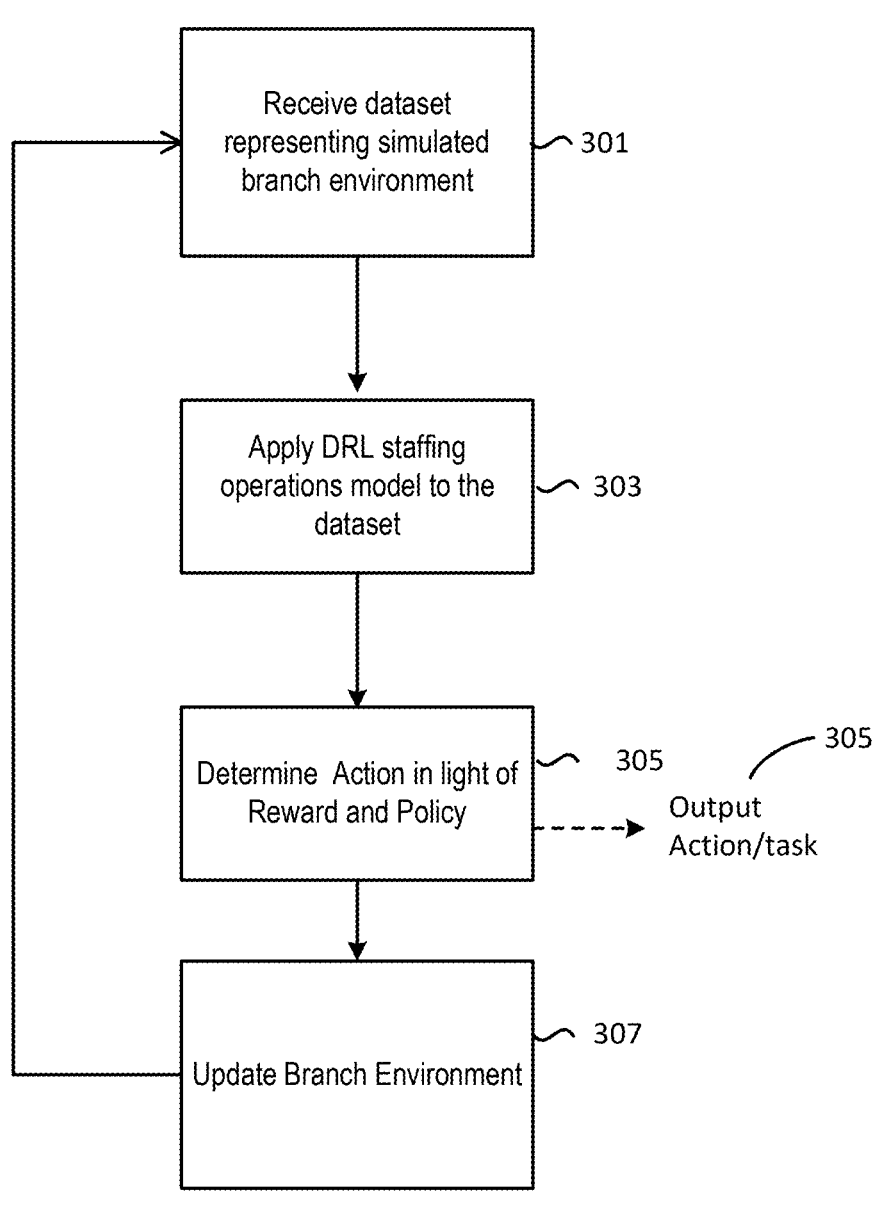
FIG. 3 is an example process flow, in accordance with embodiments of the disclosure.

FIG. 3 is an example process flow ("process") 300 that provides further detail with respect to FIGS. 1 and 2, in embodiments. In aspects, process 300 is performed by branch simulation engine 203 coupled to branch environment database 205 of FIG. 2. Accordingly, in FIG. 3, at first block 301, process 300 includes receiving a dataset representing a state (S) of a simulated branch environment from, e.g., branch environment database 205. In embodiments, at block 303, process 300 includes applying a DRL staffing operations model to the dataset. In aspects, the DRL staffing operations model predicts an effect of a next action on a current simulated branch environment (State). Process 300 may include ranking and then selecting a plurality of next possible actions that may be performed by a simulated branch personnel during training or by a real-life branch personnel (e.g., FIG. 5) according to a branch or organizational decision-making policy machine 233 and reward network 235. In embodiments, a reward function maximizes a reward in light of a policy to determine a next action at block 305 (also output 310 of FIG. 3). Accordingly, a next simulated branch environment (e.g., State n+1) is computed. Finally, in embodiments, at a block 307, branch simulation engine 203 iteratively updates and stores in branch environment database 205, another dataset to represent a next state, State n+1, of the simulated branch environment.

Note that in embodiments, branch simulation agent 203 uses a Probabilistic Dynamics Model (PDM) for a transition model, which predicts how the branch environment evolves into State n+1. In embodiments, a neural network with an activation function such as a rectified linear unit (ReLU) that takes a current environment state S and action as input and predicts the distribution of the next state Sn+1. It is understood that ReLU is only one example and that in other embodiments, other suitable activation functions may be used. In aspects, some neural networks may not naturally measure uncertainty. Therefore, a probabilistic model i.e. Bayesian neural network may represent uncertainties in the branch environment.

Note that various operations (e.g., process 300 and other processes described herein) may be described as multiple discrete operations in turn, in a manner that may be helpful in understanding embodiments; however, the order of description should not be construed to imply that these operations are order dependent.

Note that attributes and characteristics stored in branch environment database 205 that represent a branch simulation environment may include, for example, variables, e.g., open job orders for high value customers (including characteristics of the open job orders such as, e.g., current fill rate, urgency, or desirability). Other examples of attributes may include supply parameters (e.g., worker or associate availability), customer preferences, pricing strategies, market statistics, weather function, predictions from other machine learning models regarding, e.g., customer churn probabilities. In embodiments, preparing datasets may include creating data structures and classes to represent the aforementioned, e.g., classes for open job orders, workers, customers, etc. In aspects, data representing the attributes are integrated into the simulated branch environment and are used to drive decisions and interactions within a branch environment simulation. Rules and dynamics of a simulated branch environment are also stored and implemented, e.g., defining how workers are assigned to job orders, how customer interactions typically affect a branch's performance, and/or how pricing strategies impact customer choices.

In embodiments, reward network 235 implements a reward function and updates the staffing operations model based upon a computed reward value impact on a policy of the staffing organization. In embodiments, reward functions may define how branch simulation engine 203 is rewarded for its actions. For example, the reward function may assign a positive reward value for successfully assigning a worker to a high-value customer order and a negative reward value for delays or customer complaints. In aspects, a reward function also considers factors like worker satisfaction, cost efficiency, and customer retention.

Below are various example scenarios illustrating interaction between a reward function and policy of a staffing operations model.

Scenario 1: High-Value Customer Job Order

Branch Environment State (examples of defined variables): Open job orders, Availability of skilled workers, High demand from a high-value customer Outcome:

Target for Maximum Reward: Profit Gross Margin

The maximum reward may be quantified as profit Gross Margin gained from successfully assigning a worker or workers to a high-value customer job order. Profit Gross Margin is calculated based on the difference between customer bill rate and worker pay rate.

Policy Design: The policy network in the above scenario is designed to choose actions that maximize profit Gross Margin.

Scenario 2: Customer Complaint

Branch Environment State (examples of variables): Customer Complaint, Open job orders, current workload Outcome:

Target for Maximum Reward: Customer Satisfaction.

The maximum reward can be quantified in customer satisfaction terms, measured through a feedback score, e.g., from 1-5. The goal is to resolve complaints promptly and efficiently.

Policy Design: The policy network in the above scenario is designed to prioritize actions that lead to substantially maximizing customer satisfaction.

Scenario 3: Worker Retention

Branch Environment State (examples of variables): worker fill rate, worker continuous work streak, worker preferences Outcome:

Target for Maximum Reward: Worker Retention through continuous work streak

The maximum reward can be quantified by considering factors such as, e.g., the number of consecutive days a worker has been working without any breaks. Has successfully taken, performed, and been paid for a shift.

Policy Design: The policy network in the above scenario is designed to prioritize actions that lead to retaining workers by providing opportunities for continuous work and matching preferences whenever possible.

Scenario 4: Worker Utilization

Branch Environment State (examples of variables): Availability of workers, worker skills, upcoming job orders Outcome:

Target for Maximum Reward: Worker Utilization

To quantify the maximum reward for the scenario related to Worker Utilization, measure how effectively an agent can utilize available workers to meet job orders.

For example, to quantify the maximum reward:

Available Workers: Define the number of available workers as "A."

Upcoming Job Orders: Define the number of upcoming job orders as "J."

Worker Utilization: Calculate the worker utilization, which is the ratio of successfully assigned workers to the total number of Available Workers and Upcoming Job Orders:

$$\text{Worker Utilization} = (\text{Number of Successfully Assigned Workers})/(A+J)$$

Target for Maximum Reward: The maximum reward can be directly proportional to the worker utilization. The higher the worker utilization, the greater the reward. We set the maximum reward to be directly related to the maximum possible worker utilization.

$$\text{Maximum Reward} = \text{Worker Utilization}$$

In this example, the maximum reward may be quantified as the worker utilization percentage, where the agent aims to maximize this percentage. When the agent effectively assigns available workers to job orders, it will receive a higher reward.

This reward function encourages actions that lead to better worker availability and efficient utilization of workers to meet job orders.

Scenario 5: Cost Efficiency

Branch Environment State (examples of variables): Current job orders pay rate, worker costs, worker pay rate, available budget.

Outcome:

Target for Maximum Reward: Cost Efficiency

The reward is based on how well the agent manages to assign workers to job orders while staying within the budget and optimizing labor costs. The reward function takes into account factors like minimizing worker overtime costs, reducing duplicate dispatches, and staying within the budget constraints (e.g., Gross Margin Constraints). The policy prioritizes actions that lead to cost-effective staffing operations.

In embodiments, the Reward Function for scenarios, such as the above, includes a cumulative reward equation:

$$R_{cumulative} = w_1 * (R_1 + T_1) + w_2 * (R_2 + T_2) + w_i * (R_i + T_i) + \ldots + w_N$$

$R_i$ represents the reward for Scenario i, reflecting a specific objective of that scenario.

$T_i$ represents a time dependent component for scenario i, which encourages the agent to optimize its actions for long term performance.

$w_1, w_2, \ldots, w_N$ are weight coefficients that determine the importance of each scenario's objective relative to the others.

In aspects, to ensure terms in a cumulative reward function are on the same scale, individual rewards and time-related components are normalized before being summed. In aspects, the staffing operations DRL model is updated based upon at least a cumulative reward value.

Figure 4:
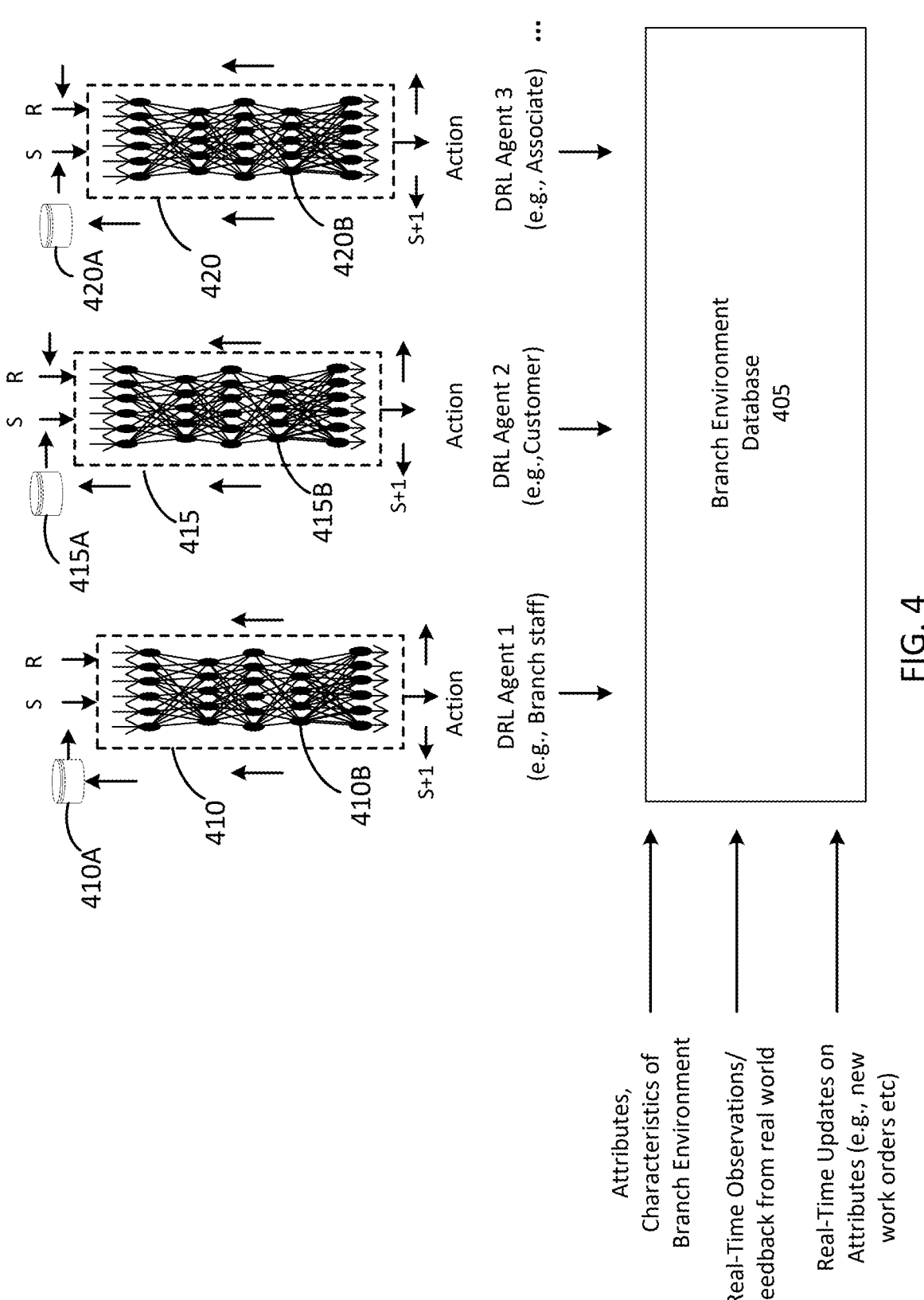
FIG. 4 is a block diagram including a branch environment database, in accordance with embodiments of the disclosure.

Referring now to FIG. 4, which illustrates a branch environment database, in accordance with embodiments of the disclosure. In embodiments, a branch environment database 405 is similar or the same as branch environment database 205 of FIG. 2 and stores datasets of attributes and characteristics representing a corresponding plurality of branch environments. In aspects, branch environment database 405 also stores real-time observations/feedback from a real-life branch environment, and receives real-time updates on attributes and characteristics of the real-life branch environment (e.g., new work orders, etc.). In some embodiments, real-time observations/feedback from the real world come from a sensor, direct input from branch personnel, or other network computers receiving information calculated from other branches and/or outside information sources (discussed further below).

In aspects, stored datasets of attributes and characteristics also include actions/output/reactions by DRL simulation environment actors. DRL simulation environment actors may be based upon, e.g., branch personnel, customers, associates or workers, or other relevant actors who affect a real-life branch environment. Thus, simulated branch personnel, customers, and associates may each have separate reinforcement learning environments and neural networks that feed into branch environment database 405.

Thus, one or more of the DRL simulation environment actors may include a custom DRL agent, e.g., 410, 415, and 420. For example, FIG. 4 illustrates e.g., NNs 410, 415, and 420 that each represent one or more NNs included in one or more respective DRL agent 1 (e.g., branch personnel), DRL agent 2 (e.g., customer of a staffing organization who supply work for associates and workers), and DRL agent 3 (e.g., associates or workers). In embodiments, the DRL agents may each be operating with their own branch environment databases (e.g., 410A, 415A, 420A) customized to branch environment variables as well as their own variables that impact their decision making-such as pay rate, geography, other competing businesses (e.g., customer). In embodiments, note that a branch environment state represents information or observations available to a DRL agent at a particular time step.

As noted previously, examples of attributes and characteristics of a simulated or real-life branch environment may include, e.g., open job orders for high value customers (including characteristics of the open job orders such as, e.g., current fill rate, urgency, or desirability), supply parameters (e.g., worker availability), customer preferences, pricing strategies, market statistics, weather function, predictions from other machine learning models regarding, e.g., customer churn probabilities.

Note that prior to branch simulation and prior to dataset storage, as a data preparation step, existing processes followed by branch personnel may be documented and analyzed to understand how decisions are made, what factors are considered, and the sources of data used. Actions that branch personnel typically take in response to various situations may be defined. For example, if a job fill rate drops below a certain threshold, branch personnel or workers may take actions like adjusting pricing or initiating customer outreach.

For a parameter or attribute that rates or defines a customer as "high value," in aspects, a high value customer can be derived by a high-value score using an example equation below:

$$\text{High Value Customer Score} = (WA*\text{Order Frequency}) + (WB*\text{Average Order Value}) + (WC*\text{Profit Margin}) + (WD*\text{CustomerFillRate}) + (WE*\text{Customer Lifetime Value}) + \text{UrgencyScore}.$$

As an example, UrgencyScore=1<Score<10 Customer

For example, WA, WB, WC, WD, WE are weighting factors that can be adjusted based on a relative importance of each factor to a staffing organization (or other organization) or branch. Weights can be fine-tuned in the equation to focus on, e.g., sales, customer service, fill-rate, margin, or customer retention.

In aspects, internal databases may be coupled to provide to branch environment database 405, various parameters. For example, regarding supply parameters (e.g., worker availability), active and available workers within reasonable geographical distances to a shift can be extracted from internal databases using a set of SQL queries. One representative example is shown below:

```
SELECT W.
FROM Workers AS w
WHERE
    w.worker_status='active'
    AND w.is_available=1
    AND (w.latitude BETWEEN min_latitude AND
        max_latitude
    AND (w.longitude BETWEEN min_longitude AND
        max_longitude
```

Other inputs to the branch environment database 405 include additional outputs from NNs executing relevant prediction models, e.g., a parameter defining customer churn (a measure of how often a customer may leave). For example, embodiments include building and implementing a custom recurrent neural network with a single neuron in an output layer with a sigmoid activation function. In embodiments, the sigmoid activation function may squash an output to a range between zero and one, representing a probability of customer return. In aspects cross entropy can be used as a loss function and stochastic gradient descent (SGD) for optimization. Finally model performance may be evaluated on metrics such as recall and area under a receiver operating characteristic curve (AUC-ROC) curve. AUC may assist in measuring performance across possible classification thresholds.

In addition, APIs may be used to retrieve outside information and then stored in a branch environment database to define S and/or S n+1. For example, regarding particular parameters, an API may be used to extract weather near a jobsite or other relevant information from an outside source. For example, regarding weather, an API can be used to retrieve data related to a worksite location by geographical region, e.g., using latitude and longitude. A wide range of weather data may be retrieved including current conditions, forecasts, and historical weather information. For example, a sample Python pseudocode of how to call an API of a weather service is shown below:

```
import requests
Get weather_data (P space latitude, P space longitude,
    p_api_key: define the base URL for the X weather API
base URL equals "https://api.openweatherforecaster.org/
    data/2.5/weather"
#Create a dictionary with the query parameters
params={
"lat": p_latitude,
"long"; p_longitude,
"appid": p_api_key,
"units": "metric" #units can be changed to "imperial" for
    Fahrenheit
}
#Make the API request
response=requests.get (base_url, params=params)
return response
```

Figure 5:
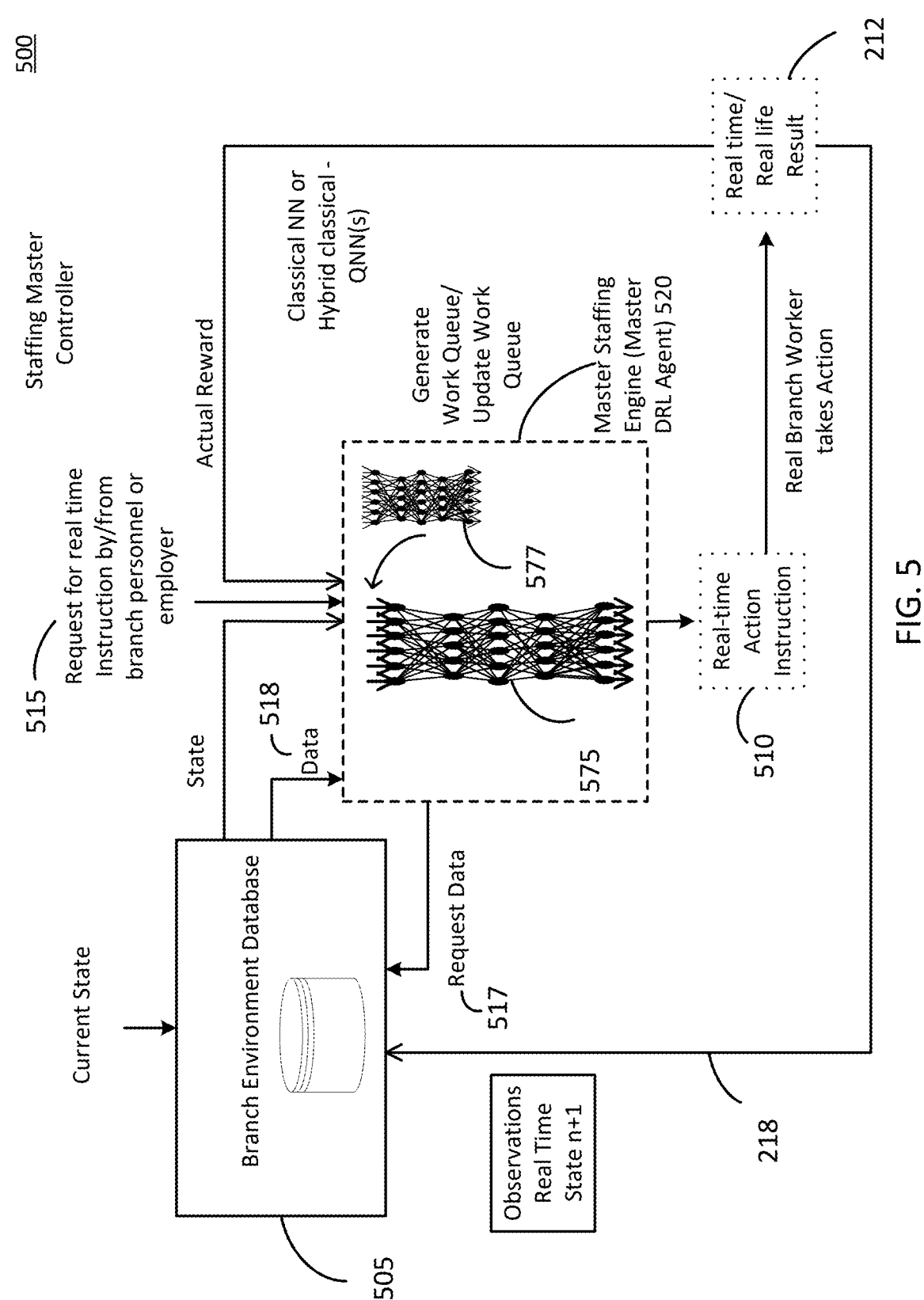
FIG. 5 is a block diagram of a deep reinforcement learning (DRL) system including a staffing master controller, in accordance with embodiments of the disclosure.

Referring now to FIG. 5 which is a block diagram further illustrating a staffing master controller, in accordance with embodiments of the disclosure. In aspects, a staffing master controller 500 performs DRL to provide a recommendation for a next real-time action, in accordance with embodiments. In the example, a staffing master engine ("master DRL agent 520") generates a work queue or updates a work queue for real-life branch employee/personnel in a real-life branch environment. In embodiments, staffing master controller 500 receives a request 515 from a real-life branch employee to generate an instruction for a next task (also, e.g., block 301 of FIG. 3). In some aspects, the real-life branch employee may input or cause parameters or attributes describing a current real-life branch environment to be input into staffing master controller 500.

In some aspects, master DRL agent 520 may analyze aspects of data describing a current real-life branch environment and then request (e.g., at 517), a dataset of a simulated branch environment similar to the current real-life branch environment. Thus, e.g., at 518, master DRL agent 520, receives a dataset of a simulated branch environment, having similar attributes to the current real-life branch environment. In some embodiments, master DRL agent 520 compares the dataset of the real-life branch environment to a plurality of stored simulated branch environment prior selecting and loading the dataset of the simulated branch environment. Master DRL agent 520 may use both varying attributes of the current real-life branch environment and results from the similar stored simulated branch environment in its determination.

In aspects, master DRL agent 520, based at least in part on the datasets, may generate as an output at 510, a real-time or real-life next action or sequence of actions for real-life branch personnel. In embodiments, master DRL agent 520 includes a policy machine/network 575 and reward network 577 trained on policies and instructions learned from a branch simulation engine (described in FIGS. 2 and 3) that predicts a plurality of simulated branch environments similar to the real-life branch environment.

In aspects, reward network 577 computes a reward function (e.g., similar or the same as described in connection with reward network 235) based upon a real-life result. In embodiments, the next action or sequence of actions for the real-life branch employee comprises a next action or sequence of actions allocated to be performed by real-life branch employee and real-life bots (e.g., FIG. 1). In embodiments, master DRL agent 520 includes a plurality of neural networks (NNs), e.g., at least a first neural network (NN) having output nodes coupled to input nodes of a second neural network (NN). In various embodiments, the first NN is coupled to receive an input from the second NN. In embodiments, the first NN may be a classical NN that computes a real-life reward and a probability of a long term real-life reward from the real-life action.

As noted previously, the QNNs discussed herein typically are included in hybrid classical-quantum neural networks. In some examples, classical layers may be layers of a classical artificial neural network and responsible for pre-processing or post-processing data (inputs) and outputs, while the quantum components or layers (e.g., QNN) may be responsible for processing high amounts of data from the different variables representing a simulated branch environments in order to predict a probable next State n+1. Thus, in aspects, input data may be encoded into quantum data and analyzed by a quantum neural network (QNN) to assist with simulating the branch environment.

As referred to in this disclosure, neural networks refer to a type of AI, a hierarchical information processing system inspired by the human brain. NNs are made up of interconnected nodes, or artificial neurons, that transmit signals to each other. The nodes are organized in layers, e.g., with an input layer, one or more hidden layers, and an output layer. The strength of the connections between neurons, called weights, influences how signals flow through the network.

The information travels through the hidden layers, where it's analyzed and transformed by the interconnected neurons. Each neuron applies a mathematical function to the input it receives from other neurons, and then sends its own output signal to other neurons in the next layer. The weights are adjusted during training, which is analogous to teaching the network to perform a specific task. By analyzing large amounts of data, the network learns to recognize patterns and relationships, allowing it to make predictions or decisions. Some examples that NNs that may be used with embodiments include, e.g., convolutional neural networks (CNNs) and recurrent neural networks (RNNs); In various embodiments, NNs used with the embodiments may include Deep Q-Networks (DQNs), Policy Gradient Networks, Actor-Critic with Function Approximation, Deep Deterministic Policy Gradients (DDPG), and Attention-based Networks.

Figure 6:
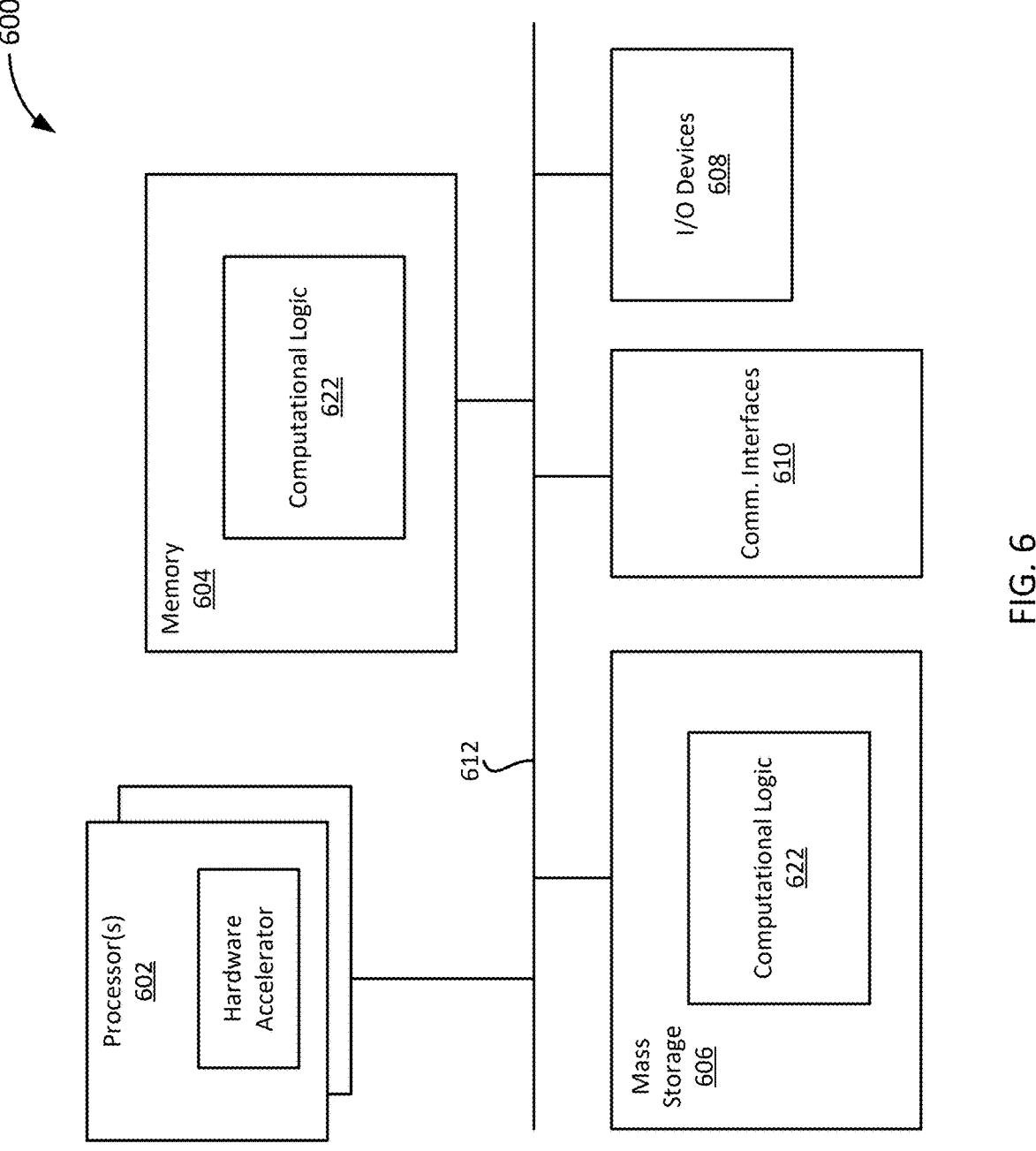
FIG. 6 is an example computing device, in accordance with embodiments of the disclosure.

FIG. 6 illustrates an example classical computing device 600 suitable for use with embodiments, such as described in connection with the other FIGS. herein (e.g., the computing devices used to perform the processes and methods described to implement a DRL staffing operations model). As shown, computing device 600 may include one or more processors or processor cores 602 and memory 604. Note that computations may be distributed across CPUs, GPUs, and TPUs as well as quantum processing units QPU's (e.g., FIG. 8).

In embodiments, memory 604 may be system memory. For the purpose of this application, including the claims, the terms "processor" and "processor cores" may be considered synonymous, unless the context clearly requires otherwise. The processor 602 may include any type of processor(s), such as a central processing unit CPU, graphics processing unit (GPU), a microprocessor, specialized artificial intelligence (AI) hardware accelerators, and the like. The processor 602 may be implemented as an integrated circuit having multi-cores, e.g., a multi-core microprocessor. The computing device 600 may include mass storage devices 606 (such as diskette, hard drive, volatile memory (e.g., dynamic random-access memory (DRAM), compact disc read-only memory (CD-ROM), digital versatile disk (DVD), and so forth). In general, memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. In embodiments, processor 602 is a high performance or server CPU.

The computing device 600 may further include input/output (I/O) devices 608 (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth). The communication interfaces 610 may be used by nodes of the networks discussed above and include communication chips that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, memory 604 and mass storage devices 606 may be employed to store a working copy and a permanent copy of the programming instructions for the calculations as described above. In embodiments, computational logic 622 is to assist in implementing the DRL staffing operations model of FIGS. 2, 3, and 5. The various elements may be implemented by assembler instructions supported by processor(s) 602 or high-level languages that may be compiled into such instructions.

The permanent copy of the programming instructions may be placed into mass storage devices 607 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a server computer in a data center, or a mobile computing device, such as a tablet computing device, laptop computer, game console, or smartphone. Their constitutions are otherwise known, and accordingly will not be further described.

In various implementations, the computing device 600 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 601 may be any other electronic device that processes data.

Figure 7:
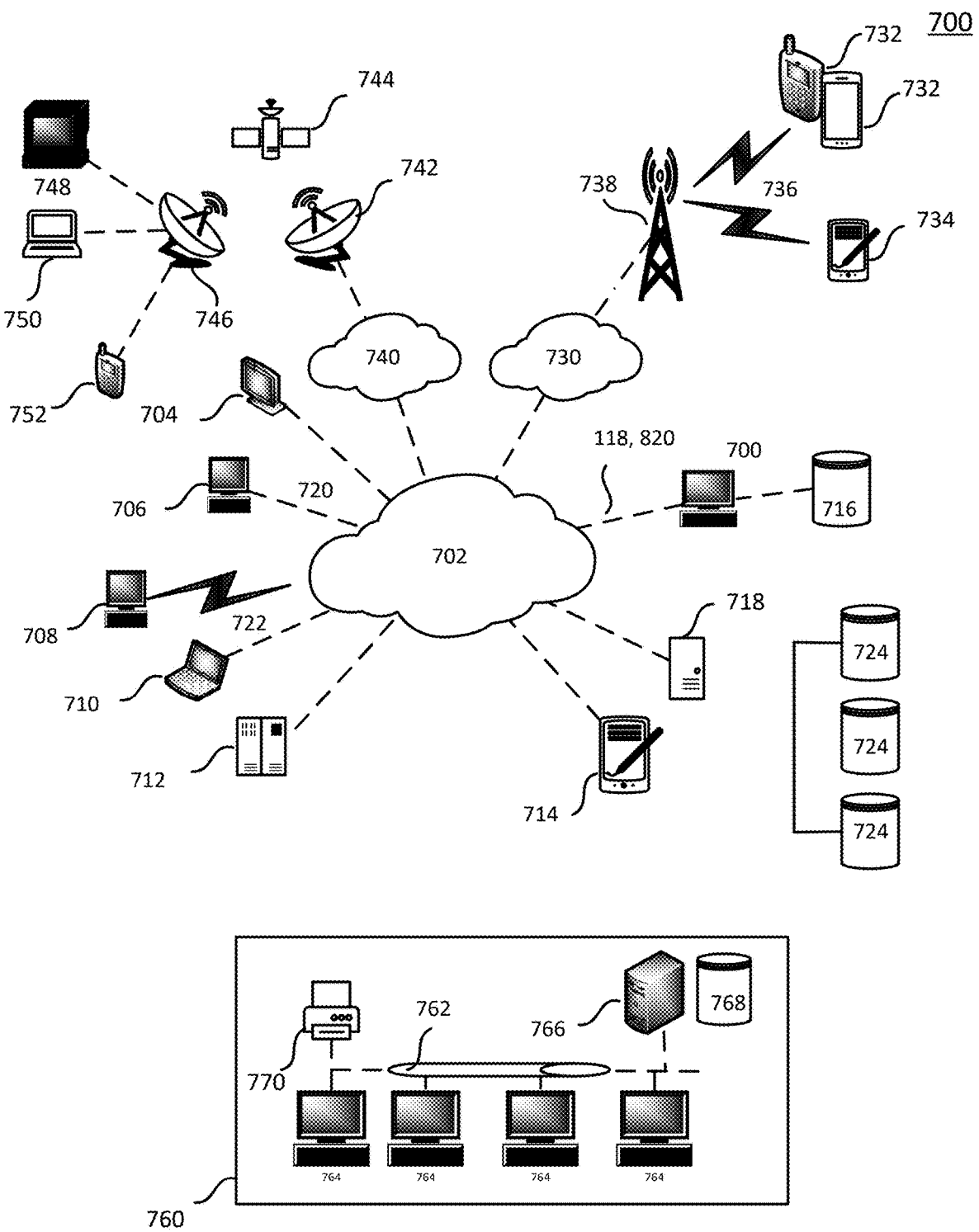
FIG. 7 is an example networked communications system which may be associated with FIGS. 1-6, in accordance with embodiments of the disclosure.

FIG. 7 illustrates a networked communications system that may include one or more computing device(s) 700. Computing device 700 can be a classical computing device coupled with a quantum computing device used to assist in implementing the DRL systems of FIGS. 2 and 5 described above and could connect to network 702, for example via the Internet or a wide area network (WAN). Other terminals, for example, thin client 704, further processing systems 706 and 708, notebook computer 710, mainframe computer 78, PDA 714, pen-based computer, server 718, etc., can be connected to network 702. A large variety of other types of terminals or configurations could be utilized. The transfer of information and/or data over network 702 can be achieved using wired communications means 720 or wireless communications means 722. Server 718 can facilitate the transfer of data between network 702 and one or more databases 724. Server 718 and one or more databases 724 provide an example of an information source that may include a branch environment database of FIG. 4 or coupled to provide the branch environment databases described herein of attributes and parameters of the simulated or real-life branch environment.

Other networks may communicate with network 702. For example, telecommunications network 730 could facilitate the transfer of data between network 702 and mobile or cellular telephone 732 or a PDA-type device 734, by utilizing wireless communication means 736 and receiving/transmitting station 738. Mobile telephone 732 devices may load software (client) that communicates with a backend server 706, 712, 718 that operates a backend version of the software. The software client may also execute on other devices 704, 706, 708, and 710. Client users may come in multiple user classes such as worker users and/or employer users.

Satellite communications network 740 could communicate with satellite signal receiver 742 which receives data signals from satellite 744 which in turn is in remote communication with satellite signal transmitter 746. Terminals, for example further processing system 748, notebook computer 750, or satellite telephone 752, can thereby communicate with network 702. A local network 760, which for example may be a private network, LAN, etc., may also be connected to network 702. For example, network 702 may relate to ethernet 762 which connects terminals 764, server 766 which controls the transfer of data to and/or from database 768, and printer 770. Various other types of networks could be utilized.

The computing device 700 is adapted to communicate with other terminals, for example further processing systems 706, 708, by sending and receiving data, 118, 820, to and from the network 702, thereby facilitating possible communication with other components of the networked communications system 702.

Thus, for example, the networks 702, 730, 740 may form part of, or be connected to, the Internet, in which case, the terminals 706, 712, 718, for example, may be web servers, Internet terminals or the like. The networks 702, 730, 740, 760 may be or form part of other communication networks. Communication channels may include or be routed through one or more wired or wireless communication utilizing IEEE 802.11 protocols, BlueTooth, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a LAN (e.g., 760), a Wide Area Network (WAN), a public network (e.g. "the Internet"), a private network, a satellite network (e.g., as shown in the Figure), or otherwise.

Figure 8:
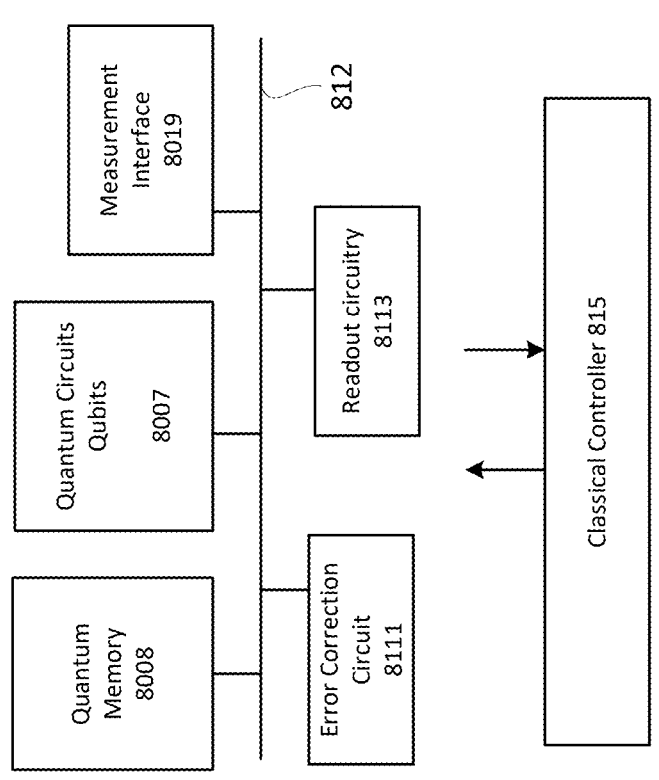
FIG. 8 is an example quantum computing device, in accordance with embodiments of the disclosure.

FIG. 8 illustrates an example quantum processing unit (QPU) 800 according to aspects of the disclosure. In aspects, QPU 800 may assist in implementing QNN's to generate a next state or parallel next states of a plurality of simulated branch environments In some aspects, QPU 800 may be coupled to a classical processor (e.g., FIG. 7) and/or work with/alongside a classical processor. QPU 800 may assist in preparing classical data into quantum data for input into a QNN. In embodiments, QPU 800 includes a quantum memory 8008, quantum circuits including quantum gates to perform operations on qubits 8007, measurement interface 8019, error correction circuit 8111 and readout circuitry 8113 coupled via quantum bus 8012. In embodiments, measurement interface 8019 may assist in measurement of a state of qubits as well as to couple qubits to a classical computing device, e.g., (600 of FIG. 6). Error correction circuit 811 may encode qubits to be corrected using quantum error correction codes (QEC), e.g., the Shor code. In embodiments, classical controller 8115 may run on a classical computing device, e.g., loading a quantum program into QPU 800, initializing qubits, applying quantum gates to the qubits, and other functions to control operation of QPU 800.

A variety of quantum computing devices may be utilized. In embodiments, quantum devices, quantum computers and/or QPUS 800 contemplated include gate-based quantum devices. In various embodiments, quantum devices may include quantum annealers, ion-trap quantum computers (states of ions or charged atoms for qubits), photonic quantum computers (e.g., use of photons), superconducting quantum computers, topological quantum computers (using of topology of certain materials to encode and manipulate qubits). Accordingly, various types of quantum memory 8008 (and/or quantum registers) are also contemplated, depending upon the types of qubits, size of quantum circuits, specific operations being performed in the quantum circuits etc. Examples may include, superconducting quantum memory, optical quantum memory, topological quantum memory that uses topological defects to store the state of the qubits, nuclear magnetic resonance (NMR) quantum memory. Various quantum gate types also depending upon implementation may include a Hadamard gate, CNOT gate, Phase gates, Controlled-Z gates, or swap gate. Note that any suitable quantum processing units or devices that may assist in quantum processing or a hybrid-classical quantum processing are contemplated for the present embodiments.

FIG. 9 is another example flow diagram, in accordance with embodiments of the disclosure. In aspects, process 900 is a method associated with implementing a branch simulation engine 203 or master staffing engine 520 as quantum hybrid simulation engines. For example, at first block 901, process 900 includes to encode classical input data sets, e.g., attributes and characteristics of representing a branch environment state, as quantum states through custom quantum algorithms that leverage superposition and entanglement. In some embodiments, a parametrized quantum circuit is to encode inputs into quantum states so that the quantum computer can perform computations on it.

At a next block 903, in embodiments, the process includes to prepare a reinforcement learning environment composed of superpositions of variables encoded in a unified quantum data set. Note that in embodiments, the relevant algorithms can leverage custom quantum circuits.

In a next embodiment, at a block 905, the process includes to train a quantum deep reinforcement learning agent (e.g., branch simulation engines or agents of FIGS. 2 and 5) to simultaneously explore all possible actions to take in a given environmental state. Note that quantum computing may effectively solve the curse of dimensionality problem.

At block 907, in aspects, each action is preceded by classical predictions of supply and demand variables, which become part of the branch environmental state.

At a block 909, in embodiments, an agent does not obtain intermittent reward; In embodiments, the agent must find a policy or sequence of actions that maximizes the cumulative reward (e.g., see description of cumulative reward equations described earlier).

At a block 911, process 900 may map the quantum agent back into a classical (trained) DRL agent or network, to receive ground truth as input and output a recommended or best action to take at that time. As noted in a block 913, the process will periodically retrain the agent as new data is added to the original input datasets (e.g., see FIG. 4).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, high-performance server computer or otherwise. A server computer may be located remotely in a data center or be stored locally.

What is claimed is:

1. A computer-implemented method, comprising:

receiving by a branch simulation engine, from a database, a first dataset that represents a simulated branch environment;

applying by the branch simulation engine, a deep reinforcement learning (DRL) staffing operations model to the first dataset to predict a next action or task for a branch worker, wherein the DRL staffing operations model weighs impacts of a reward to substantially maximize the reward in light of a policy to determine the next action;

iteratively updating, by the branch simulation engine, the database that includes the first dataset to include a second dataset to represent a next state of the simulated branch environment after the next action is performed;

providing one or more policies including the policy or instructions learned by the branch simulation engine from the DRL staffing operations model to a master DRL agent, wherein the master DRL agent is configured to recommend a real-life action in a real-life branch environment and comprises at least a first neural network (NN) and a second neural network (NN), wherein the first NN is coupled to receive an input from the second NN, and wherein the second NN is a classical NN that computes a real-life reward and a probability of a long-term real-life reward from the real-life action, wherein the master DRL agent generates an output configured to cause a computing device to dispatch a digital work assignment corresponding to a selected real-life action determined based on the computed probability of the real-life reward or long-term real-life reward.

2. The computer-implemented method of claim 1 wherein the branch simulation engine computes and ranks a plurality of next possible actions or tasks that are performed by a simulated branch worker according to the policy.

3. The computer-implemented method of claim 1 wherein the branch simulation engine comprises a quantum hybrid simulation engine including classical computing devices to assist in preparing data coupled to a quantum computing device that assists in determining an effect of the action or task on the simulated branch environment.

4. The computer-implemented method of claim 1, wherein the policy is determined by a policy machine of the branch simulation engine trained to output a next action for a real-life branch agent, where inputs to the policy machine include data representing a current real-world branch environment.

5. The computer-implemented method of claim 1, wherein the policy comprises a policy of a staffing organization and/or branch and includes variables representing objectives and values such as, at least, one or more of maximizing profit, worker safety, customer satisfaction, or environmental impact.

6. The computer-implemented method of claim 1, wherein the first and the second dataset include attributes representing a branch environment comprising one or more of open job orders, high value or lower value customers, worker availability, customer preferences, or current pricing strategies.

7. The computer-implemented method of claim 1 wherein a reward network of the DRL staffing operations model implements a reward function and updates the staffing operations model based upon a computed reward value impact on the policy, including a policy of the staffing organization.

8. A system, comprising:

one or more processors; and a memory that stores machine-readable instructions that when executed by the one or more processors cause the system to:

receive a request to generate an instruction for a next task in a real-life branch environment;

access a first dataset including attributes of a stored simulated branch environment similar to a second dataset of attributes of the real-life branch environment;

based at least in part on the first dataset and the second dataset, request or cause generation of a next action or sequence of actions for a real-life worker by a master staffing engine, wherein the master staffing engine is trained on policies and instructions learned from a branch simulation engine that predicts a plurality of simulated branch environments similar to the real-life branch environment, wherein the master staffing engine comprises a master deep reinforcement learning (DRL) agent that includes at least a first neural network (NN) and a second neural network (NN) and wherein the first NN is coupled to receive an input from the second NN and wherein the second NN is a classical NN that computer a real-life reward and a probability of a long-term real-life reward from the next action in the real-life branch environment;

generate, for transmission to a computing device used by the real-life worker, a data structure that causes the computer device to render a dynamically updated work queue on a display, wherein the work queue comprises an ordered list of potential real-life actions, and wherein a priority of each of the potential real-life actions within the ordered list is determined based on the computed real-life reward or probability of the long-term real-life reward.

9. The system of claim 8 wherein the classical neural network is trained via reinforcement learning to determine a reward based on a reward function related to customer satisfaction, high-value customer satisfaction, worker retention, customer complaints, or worker utilization.

10. The system of claim 8 wherein the one or more processors are coupled to or includes a quantum processing unit (QPU).

11. The system of claim 8 wherein the system includes a hybrid-classical quantum neural network including a quantum portion including quantum layers.

12. A method, comprising:

receiving a request from a real-life worker or branch to generate by a master staffing engine, an instruction for a next task in a real-life branch environment;

loading into the master staffing engine, a first dataset including attributes of a stored simulated branch environment similar to a second dataset of attributes of the real-life branch environment;

based at least in part on the first dataset and the second dataset, causing generation by the master staffing engine, of a next action or sequence of actions for the real-life worker, wherein the master staffing engine is trained on policies and instructions learned from a branch simulation engine that predicts a plurality of simulated branch environments similar to the real-life branch environment, wherein the master staffing engine comprises a master DRL agent that includes at least a first neural network (NN) and a second neural network (NN) and wherein the first NN is coupled to receive an input from the second NN and wherein the second NN is a classical NN that computer a real-life reward and a probability of a long-term real-life reward from the next action in the real-life branch environment; and generating an output configured to cause a computing device to dispatch a digital work assignment corresponding to a selected real-life action determined based on the computer probability of the real-life reward or long-term real-life reward.

13. The method of claim 12, wherein the real-life reward is computed using a reward function based upon a real-life result.

14. The method of claim 12, further comprising comparing the real-life branch environment to the stored simulated branch environment before loading the first dataset.

15. The method of claim 12, wherein the sequence of actions comprise real-life next actions of an ordered list including actions allocated to be performed by the real-life worker and bots.

16. The method of claim 12, wherein real-life observations of a result in the real-life branch environment are used to update a model of the master staffing engine.

17. The method of claim 12, wherein the branch simulation engine comprises a quantum hybrid simulation engine including classical computing devices to assist in preparing data coupled to a quantum computing device that assists in determining an effect of the action or task on a first simulated branch environment.

* * * * *